United States Patent
Lindee

(12) 
(10) Patent No.: US 6,484,615 B2
(45) Date of Patent: *Nov. 26, 2002

(54) SLICING BLADE FOR CONCURRENTLY SLICING A PLURALITY OF PRODUCT LOAVES DISPOSED IN A SIDE-BY-SIDE RELATIONSHIP

(75) Inventor: Scott A. Lindee, Mokena, IL (US)

(73) Assignee: Formax, Inc., Mokena, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/911,821

(22) Filed: Aug. 15, 1997

(65) Prior Publication Data

US 2002/0059858 A1 May 23, 2002

(51) Int. Cl.[7] .............................. B26D 7/26; B26D 1/28; B26D 7/32; B26D 5/20
(52) U.S. Cl. .................................. 83/596; 83/86; 83/88; 83/409.2; 83/444; 83/672; 83/932; 30/309; 30/310; 30/347
(58) Field of Search .......................... 83/352, 355, 596, 83/672, 677, 932, 356, 368, 703, 698.51, 699.51, 444, 471, 86, 88, 409.2; 30/309, 310, 347

(56) References Cited

U.S. PATENT DOCUMENTS

| 207,757 A | * | 9/1878 | Matthews et al. | ......... 83/596 X |
|---|---|---|---|---|
| 1,825,421 A | * | 9/1931 | Roesch | ...................... 83/355 X |
| 1,974,602 A | * | 9/1934 | Dziedzic | .................... 83/672 X |
| 2,047,399 A | * | 7/1936 | Walter | ....................... 83/355 X |
| 3,969,966 A | * | 7/1976 | Dillon | ........................ 83/672 X |
| 4,151,772 A | * | 5/1979 | Johnson | ....................... 83/355 |
| 4,523,501 A | * | 6/1985 | Mengel | ..................... 83/355 X |
| 5,042,340 A | * | 8/1991 | Kasper | ..................... 83/932 X |
| 5,282,406 A | * | 2/1994 | Ng | ............................ 83/932 X |
| 5,482,166 A | * | 1/1996 | Brown | ...................... 83/932 X |
| 5,649,463 A | * | 7/1997 | Lindee | ......................... 83/174 |
| 5,979,285 A | * | 11/1999 | Rasmussen et al. | ....... 83/596 X |
| 5,988,033 A | * | 11/1999 | Skaar et al. | ................... 83/596 |

FOREIGN PATENT DOCUMENTS

| DE | 1049260 | * | 1/1959 | ................... 30/309 |
|---|---|---|---|---|
| DE | 2038300 | * | 2/1972 | ................... 83/703 |
| EP | 0 738 566 A2 | | 10/1996 | |

OTHER PUBLICATIONS

Sketch (Exhibit D—two pages) of prior commercial blade used to slice a single loaf.

* cited by examiner

Primary Examiner—Charles Goodman
(74) Attorney, Agent, or Firm—Polit & Associates, LLC

(57) ABSTRACT

A slicing machine including a slicing blade for slicing at least first and second product loaves disposed in a side-by-side arrangement using a single rotation of the slicing blade is set forth. A single rotation of the slicing edge about the center of rotation results in a penetration gradient into each of the first and second product loaves that diminishes in magnitude over the single rotation. To this end, the slicing edge may have a profile defined a plurality of constant radius sections. Each constant radius section has a section center defining the center of the constant radius for that constant radius section. Further, each constant radius section has a section center differing from the section center of an adjacent constant radius section. Such a blade and its associated slicing station provide great control of slices from the loaves as they proceed from the loaf to a receiving conveyor of the slicing station.

20 Claims, 16 Drawing Sheets

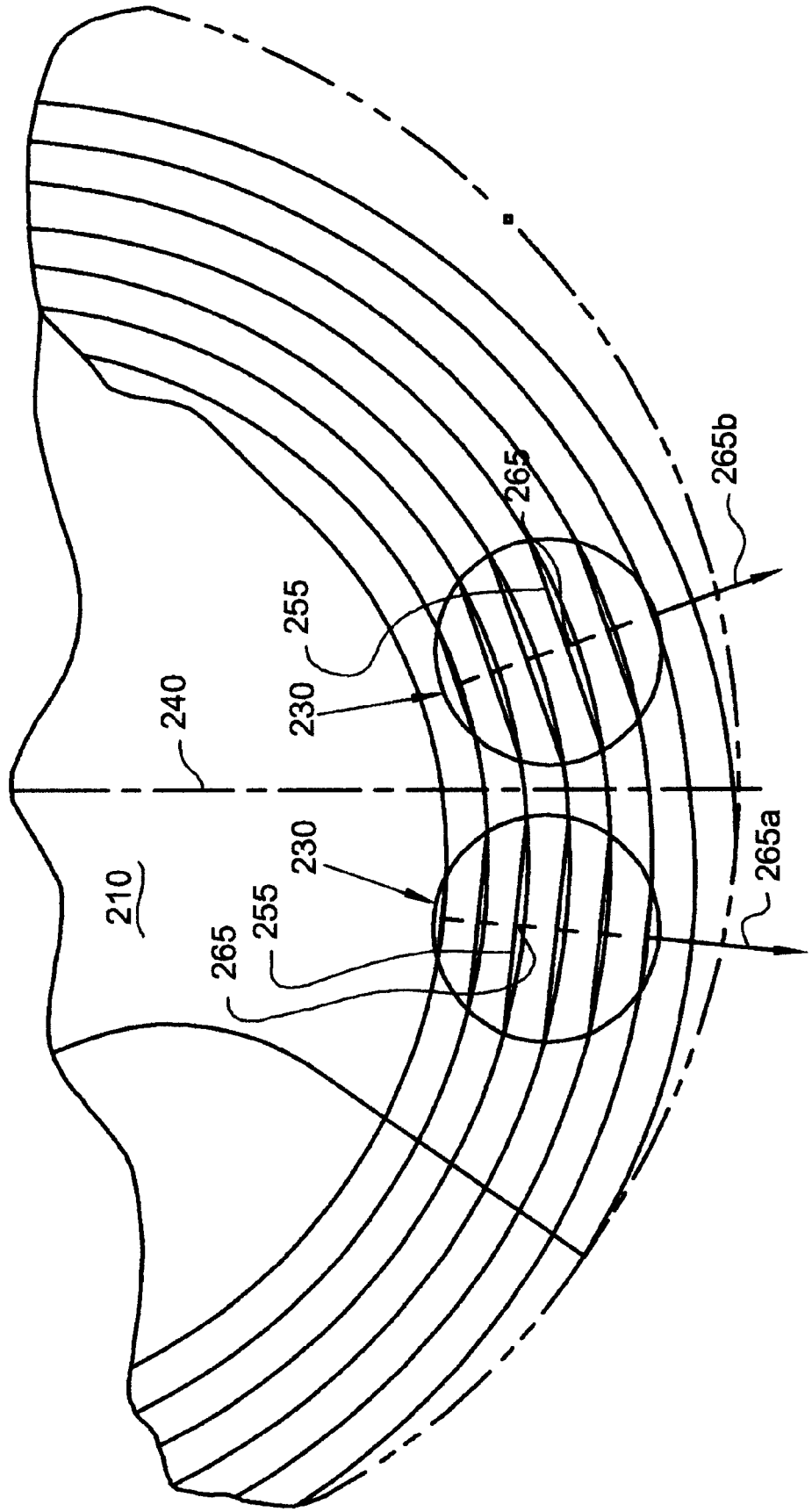

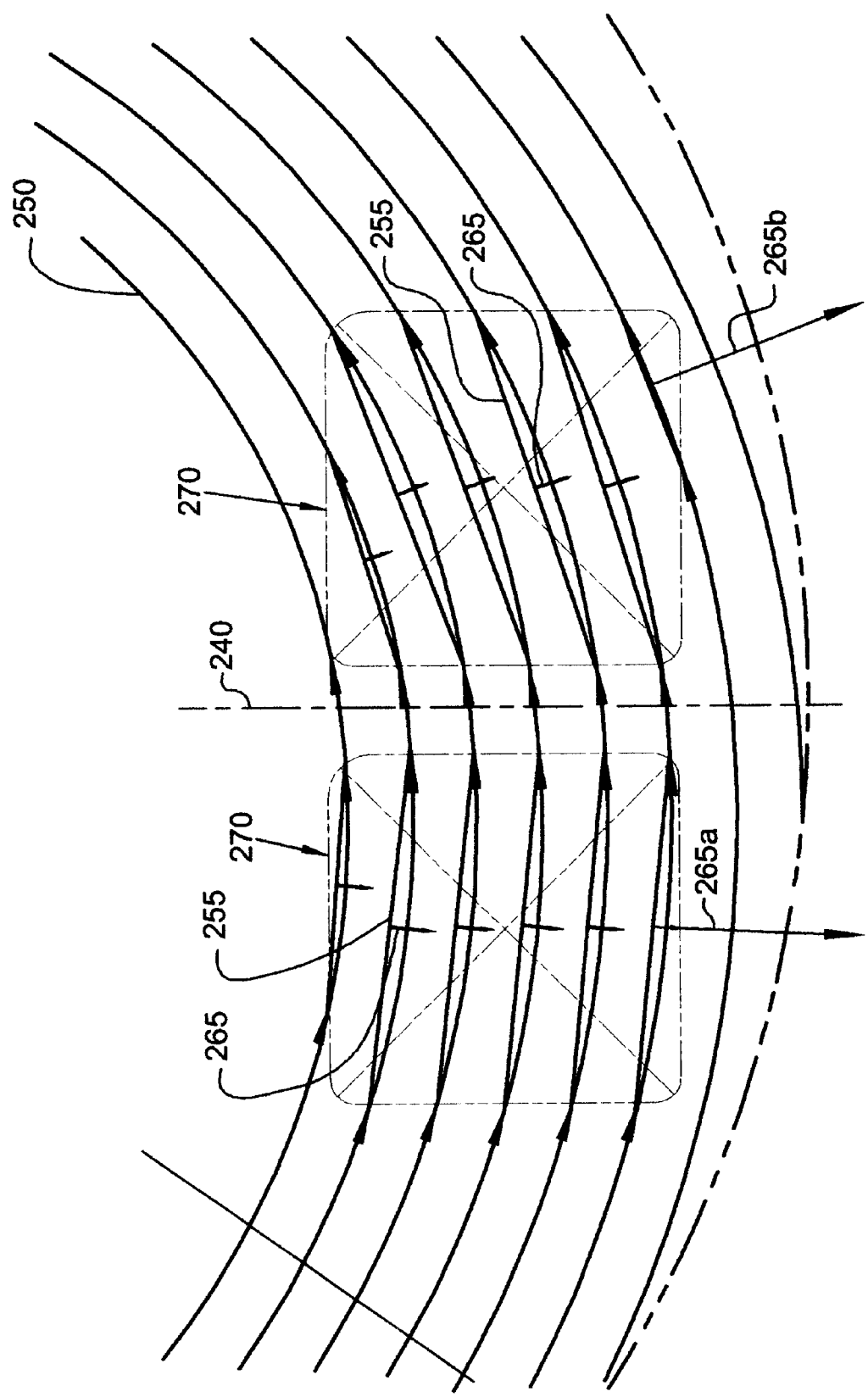

SLICING BLADE FOR CONCURRENTLY SLICING A PLURALITY OF PRODUCT LOAVES DISPOSED IN A SIDE-BY-SIDE RELATIONSHIP

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

Food loaves come in a variety of shapes (round, square, rectangular, oval, etc.), cross-sections, and lengths. Such loaves are made from various comestibles, such as meat, cheese, etc. Most loaves are provided to an intermediate processor who slices and packages the products in groups for retail.

A variety of machines have been developed to slice such loaves. One such machine is an S-180™ available from Formax®, Inc., of Mokena, Ill. The S-180™ machine is a high speed food loaf slicing machine that slices one, two, or more food loaves simultaneously using one cyclically driven slicing blade. Independent loaf feed drives are provided so that slices cut from one loaf may vary in thickness from slices cut from the other loaf. The machine includes a slicing station that is enclosed by a housing, except for a limited slicing opening. The slicing blade is disposed in the slicing station and a drive rotates the slicing blade at a predetermined cyclical rate on a cutting path through a slicing range that intersects the food loaves as they are fed into the slicing station. A marker moving with the blade is sensed by a fixed sensor to establish a home position for the blade.

In the foregoing machine, the food loaf slices are received in groups of predetermined weight on a receiving conveyor that is disposed adjacent the slicing blade. The receiving conveyor receives the slices as they are cut by the slicing blade. In many instances, neatly aligned stacked groups are preferred and, as such, the sliced product is stacked on the receiving conveyor before being transferred from the machine. In other instances, the groups are shingled so that a purchaser can see a part of every slice through a transparent package. In these other instances, conveyor belts of the receiving conveyor are gradually moved during the slicing process to separate the slices.

Whether the product is provided in a stacked or shingled format, it is desirable to ensure proper positioning of the slices as they proceed from the slicing blade onto the receiving conveyor for stacking or shingling. Traditionally, round or involute slicing blades have been employed that provide adequate positioning of the slices as they are stacked or shingled during low slicing speed operations. However, the present inventors have recognized that control of the slices as they proceed from the slicing blade onto the receiving conveyor may be necessary during high slicing speed machine operation. Absent such control, product stacks are non-uniform as is the spacing between slices of shingled product. The present inventors have recognized the need for reducing the non-uniformity associated with high speed slicing operations. Accordingly, they have invented a slicing blade for slicing a single loaf and/or concurrently slicing a plurality of product loaves disposed in a side-by-side relationship that meets the foregoing need.

BRIEF SUMMARY OF THE INVENTION

A slicing machine for slicing at least first and second product loaves disposed in a side-by-side arrangement using a single rotation of a single slicing blade in a slicing station is set forth. The slicing station includes a slicing edge of the slicing blade and a midway axis passing generally equidistant between the at least first and second product loaves. The midway axis lies generally in a plane of the slicing blade. The blade is mounted in the slicing station for rotation about an offset rotation axis that is displaced from the midway passing axis. As such, the slicing edge generates substantially similar but oppositely directed product throwing angles for the first and second product loaves with respect to the midway axis. Preferably, the offset rotation axis is laterally displaced from the midway passing axis. In accordance with a further inventive aspect of the presently disclosed system, a single rotation of the slicing edge about the center of rotation results in a penetration gradient into each of the first and second product loaves that diminishes in magnitude over the single rotation. To this end, the slicing edge may have a profile defined by a plurality of constant radius sections. Each constant radius section has a section center defining the center of the constant radius for that constant radius section. Further, each constant radius section has a section center differing from the section center of an adjacent constant radius section. Such a blade and its associated slicing station provide great control of slices from the loaves as they proceed from the loaf to a receiving conveyor of the slicing station. In accordance with a further aspect of the present invention, a single rotation of the slicing edge about the center of rotation results in substantially concurrent severance of first and second slices from the first and second product loaves thereby facilitating a decrease in the duration of a slicing cycle.

BRIEF DESCRIPTION OF THE SEVERAL VIEWS OF THE DRAWINGS

FIGS. 4–7 illustrate operation of a prior art involute slicing blade in a traditional slicing station when slicing food loaves that are disposed in a side-by-side manner.

DETAILED DESCRIPTION OF THE INVENTION

Figure 1:
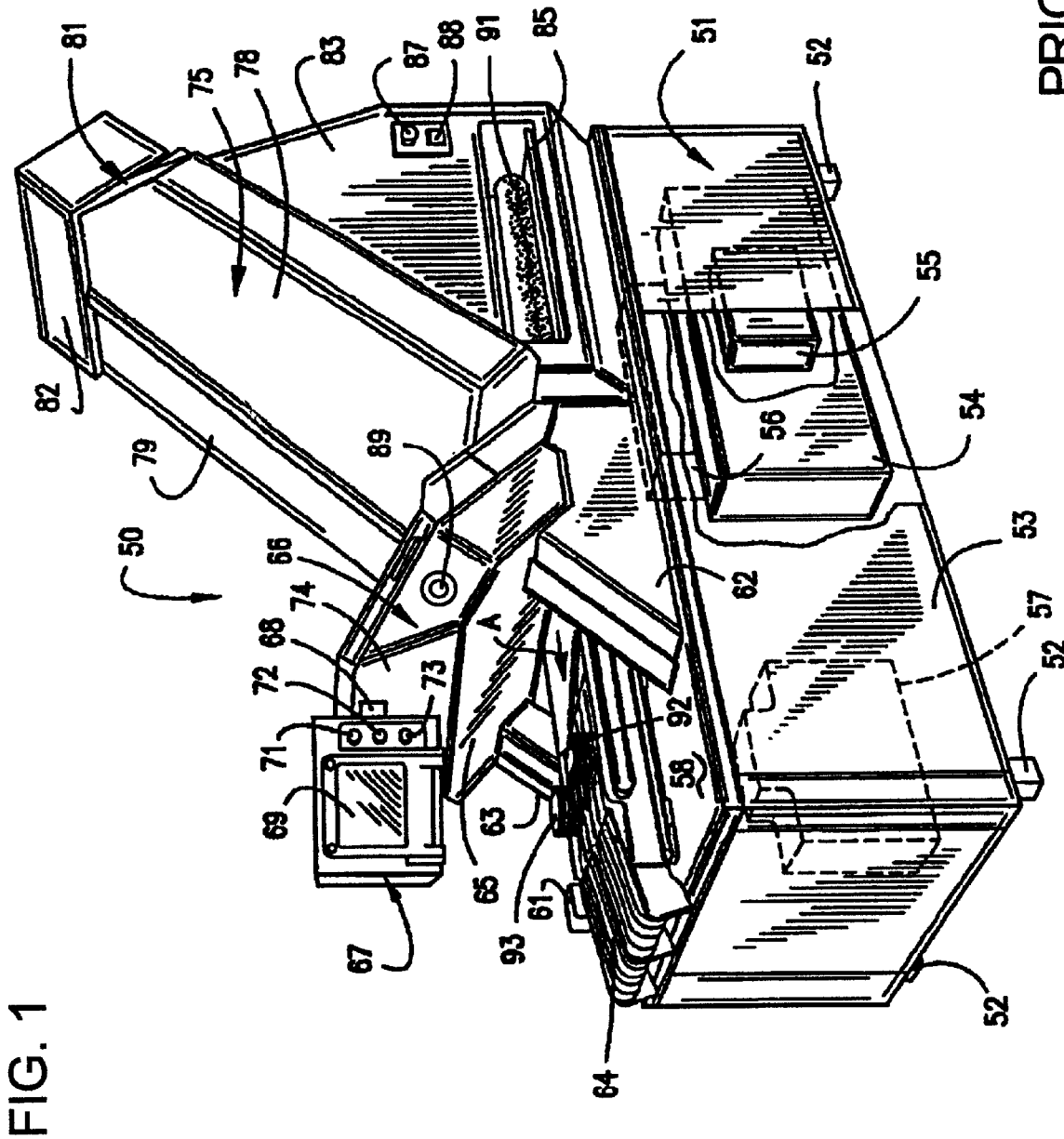
FIGS. 1 and 2 are perspective views of various aspects of one type of prior art slicing machine that may use the slicing station of the present invention.

FIG. 1 illustrates one embodiment of a food loaf slicing machine 50 that may incorporate the slicing blade of the present invention. Slicing machine 50 comprises a base 51 that is mounted upon four fixed pedestals or feet 52 (three of the feet 52 appear in FIG. 1) and has a housing or enclosure 53 surmounted by a top 58. Base 51 typically affords an enclosure for a computer 54, a low voltage supply 55, a high voltage supply 56, and a scale mechanism 57. Base enclosure 53 may also include a pneumatic supply or a hydraulic supply, or both (not shown).

The slicing machine 50 may include a conveyor drive 61 utilized to drive an output conveyor/classifier system 64. A front side guard 62 extends upwardly from the top 58 of base 51 at the near side of the slicing machine 50 and a similar front side guard 63 appears at the opposite side of machine 50. The two side guards 62 and 63 extend upwardly from base top 58 at an angle and terminate at the bottom 65 of a slicing station 66. Member 65 constitutes a part of the housing for slicing station 66. A conveyor/classifier guard (not shown) is preferably disposed between side guards 62 and 63, below the bottom 65 of slicing station 66.

The slicing machine 50 of the illustrated embodiment further includes a computer display touch screen 69 in a cabinet 67 that is pivotally mounted on and supported by a support 68. Support 68 is affixed to and projects outwardly from a member 74 that constitutes a front part of the housing of slicing station 66. Cabinet 67 and its computer display touch screen 69 are pivotally mounted so that screen 69 can face either side of slicing machine 50, allowing machine 50 to be operated from either side. Cabinet 67 also serves as a support for a cycle start switch 71, a cycle stop switch 72, and a loaf feed on-off switch 73. Switches 71–73 and display/touch screen 69 interface with computer 54 in base 51.

The upper right-hand portion of slicing machine 50, as seen in FIG. 1, comprises a loaf feed mechanism 75 which, in machine 50, includes a manual feed from the right-hand (far) side of the machine and an automated feed from the left-hand (near) side of the machine. Loaf feed mechanism 75 has an enclosure that includes a far-side manual loaf loading door 79 and a near-side automatic loaf loading door 78. As such, slicing machine 50 is equipped for automated loading of loaves from the near-side, as seen in FIG. 1, and manual loading of food loaves on the far-side of the machine. It will be understood that automated loaf loading may be provided on either or both sides of the machine; the same holds true for manual loaf loading.

Slicing machine 50 further includes a pivotable upper back frame 81 and an upper back housing 82. Back frame 81 supports the upper ends of many of the components of loaf feed mechanism 75. A loaf feed guard 83 protects the nearside of the loaf feed mechanism 75 and shields mechanism 75 from a machine operator. There may be a similar guard on the opposite side of the machine. Behind loaf feed guard 83 there is a loaf lift tray 85 employed to load a food loaf into mechanism 75 during an automated loaf loading operation of machine 50.

There are some additional switches seen in FIG. 1. An emergency stop switch 87 for interrupting all operations of slicing machine 50 is mounted on the near side of loaf feed guard 83. There may be a similar emergency stop switch on the opposite side of the machine. A loaf lift switch 88 is used to initiate automated loading of a loaf from tray 85 into mechanism 75 and is located immediately below switch 87. There would be a like switch on the opposite side of slicing machine 50 if that side of the machine were equipped for automated loaf loading. An emergency stop switch 89 is mounted on slicing station 66 on the near-side of machine 50, and there is a similar switch (not shown) on the opposite side of the slicing station. Switches 87, 88, and 89, and any counterparts on the opposite (far) side of slicing machine 50, are all electrically connected to the controls in enclosure 54.

Figure 2:
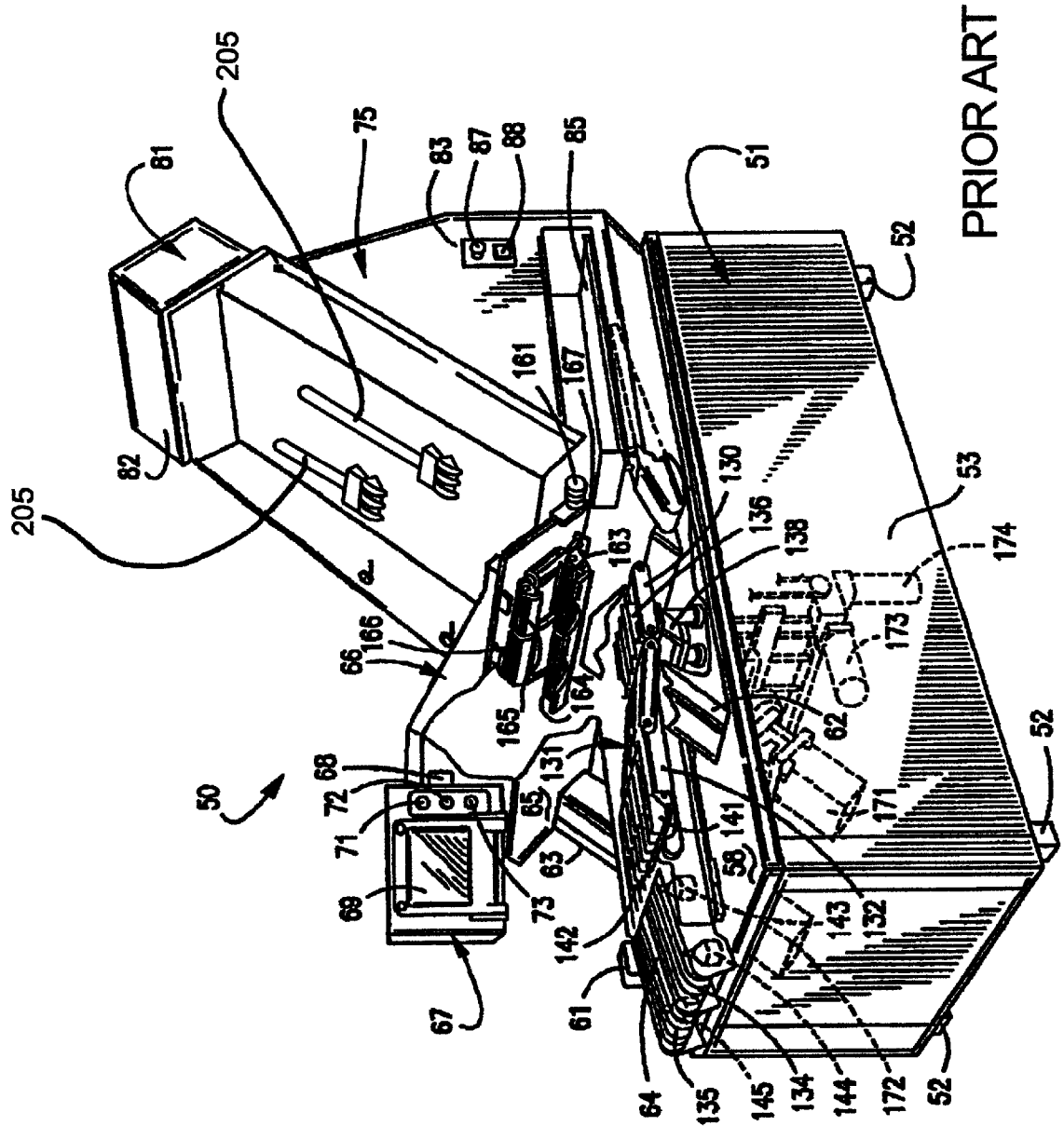

Referring first to conveyor/classifier system 64 at the left-hand (output) end of slicing machine 50 as illustrated in FIG. 2, it is seen that system 64 includes an inner stacking or receiving conveyor 130 located immediately below slicing station 66. Conveyor 130 is sometimes called a "jump" conveyor. From conveyor 130 groups of food loaf slices, stacked or shingled, are transferred to a decelerating conveyor 131 and then to a weighing or scale conveyor 132. From the scale conveyor 132 groups of food loaf slices move on to an outer classifier conveyor 134. On the far side of slicing machine 50 the sequence is substantially the same.

Slicing machine 50 may further include a vertically movable stacking grid 136 comprising a plurality of stack members joined together and interleaved one-for-one with the moving elements of the inner stack/receive conveyor 130. Stacking grid 136 can be lowered and raised by a stack lift mechanism 138. Alternatively, food loaf slices may be grouped in shingled or in stacked relationship directly on the receive/stack conveyor 130, with a series of stacking pins replacing grid 136. When this alternative is employed, lift mechanism 138 is preferably connected directly to and is used for vertical positioning of conveyor 130.

Slicing machine 50 further comprises a scale or weighing grid comprising a first plurality of scale grid elements 141 and a second similar group of scale grid elements 142; each group of grid elements is interleaved one-for-one with the moving belts or like members of scale conveyor 132. Scale grids 141 and 142 are a part of scale mechanism 57 (see FIG. 1). A scale conveyor lift mechanism 143 is provided for and is mechanically connected to scale conveyor 132. There is no weighing mechanism associated with either of the two output or classifier conveyors 134 and 135 in the disclosed embodiment. However, there is a classifier conveyor lift mechanism 144 connected to the near-side classifier conveyor 134. A similar lift device 145 is provided for the other output classifier conveyor 135. Lift devices 144 and 145 are employed to pivot conveyors 134 and 135, respectively, from their illustrated positions to elevated "reject" positions, depending on the results of the weighing operations in machine 50 ahead of conveyors 134 and 135.

Slicing machine 50 is intended to accommodate food loaves of widely varying sizes, As such, a height adjustment for the food loaves as they move from loaf feed mechanism 75 into slicing station 66 is provided. This height adjustment is shown generally at 161 of FIG. 3.

Loaf feeding mechanism 75 preferably includes a back-clamp respectively associated with each food loaf. The back-clamps 205 secure the rear portion of each loaf and assist in advancing each loaf at individually determined rates into the slicing station 66. The loaf feeding mechanism 75 also preferably comprises a system of short conveyors for advancing food loaves from loaf feed mechanism 75 into slicing station. FIG. 2 shows two short lower loaf feed conveyors 163 and 164 on the near and far-sides of slicing machine 50, respectively. These short lower conveyors 163 and 164 are located immediately below two short upper feed conveyors 165 and 166, respectively. As used in describing conveyors 163–166, the term "short" refers to the length of the conveyors parallel to the food loaf paths along support, not to the conveyor lengths transverse to those paths. The upper conveyor 165 of the pair 163 and 165 is displaceable so that the displacement between conveyors 163 and 165 can be varied to accommodate food loaves of varying height. This adjustment is provided by a conveyor lift actuator 167 that urges conveyor 165 downwardly. A similar conveyor actuator is located on the far-side of machine 50 to adjust the height of the other upper short conveyor 166; the second actuator cannot be seen in FIG. 3. In addition, an end plate 168 is disposed adjacent the conveyors 163–166 with recesses for guiding the respective loaves to the blade.

The slicing machine 50 of FIG. 1 is shown in a state ready for operation. There is a food loaf 91 on tray 85, waiting to be loaded into loaf feed mechanism 75 on the near-side of machine 50. Two, three, or even four food loaves may be stored on tray 85, depending on the loaf size. A similar food loaf or loaves may be stored on a corresponding loaf lift tray on the opposite side of machine 50. Machine 50 produces a series of stacks 92 of food loaf slices that are fed outwardly of the machine, in the direction of the arrow A, by conveyor classifier system 64. Machine 50 also produces a series of stacks 93 of food loaf slices that move outwardly of the machine on its output conveyor system 64 in the direction of arrow A. Stack 92 is shown as comprising slices from a rectangular loaf, and stack 93 is made up of slices from a round loaf. However, it is usually desirable that both of the slice stacks 92 and 93 are the same shape, either both round, square, or rectangular. Stacks 92 and 93 may have different heights, or slice counts, and hence different weights. As shown, they contain the same number of food loaf slices in each stack, but that condition can be changed. Both groups of slices can be overlapping, "shingled" groups of slices instead of having the illustrated stacked configuration.

The loaf feed mechanism 75 drives the loaves into the slicing station where they are sliced by a rotating knife blade (not illustrated in FIG. 2) that is disposed at the output portions of the short conveyors. The thickness and total weight of the slices are controlled by computer 54 which actuates various mechanical components associated with the slicing operation. The slice thickness and total weight for each sliced group are programmed through the touch screen 67 which interfaces with computer 54. As the blade slices the loaves, the slices are deposited on receiving conveyor 130 where the proper number of slices are either stacked or shingled. The receiving conveyor 130 then drives the groups from the slicing station for subsequent classifying and packaging.

Some of the drive motors for operating the mechanisms in slicing machine 50 are shown in FIG. 2. The drive motor for the blade in slicing station 66 is preferably a D.C. variable speed servo motor 171 mounted in the machine base 51. The receiver lift mechanism 138 is driven by a stacker lift motor 173, again preferably a variable speed D.C. servo motor. On the near side of machine 50 the loaf feed drive mechanism comprising the back-clamp 205 and the short loaf feed conveyors 163 and 165 is driven by a servo motor 174. A like motor on the far side of machine 50 (not shown) affords an independent drive for the back-clamp and the "short" loaf feed conveyors 164 and 166 on that side of the slicing machine.

Figure 3:
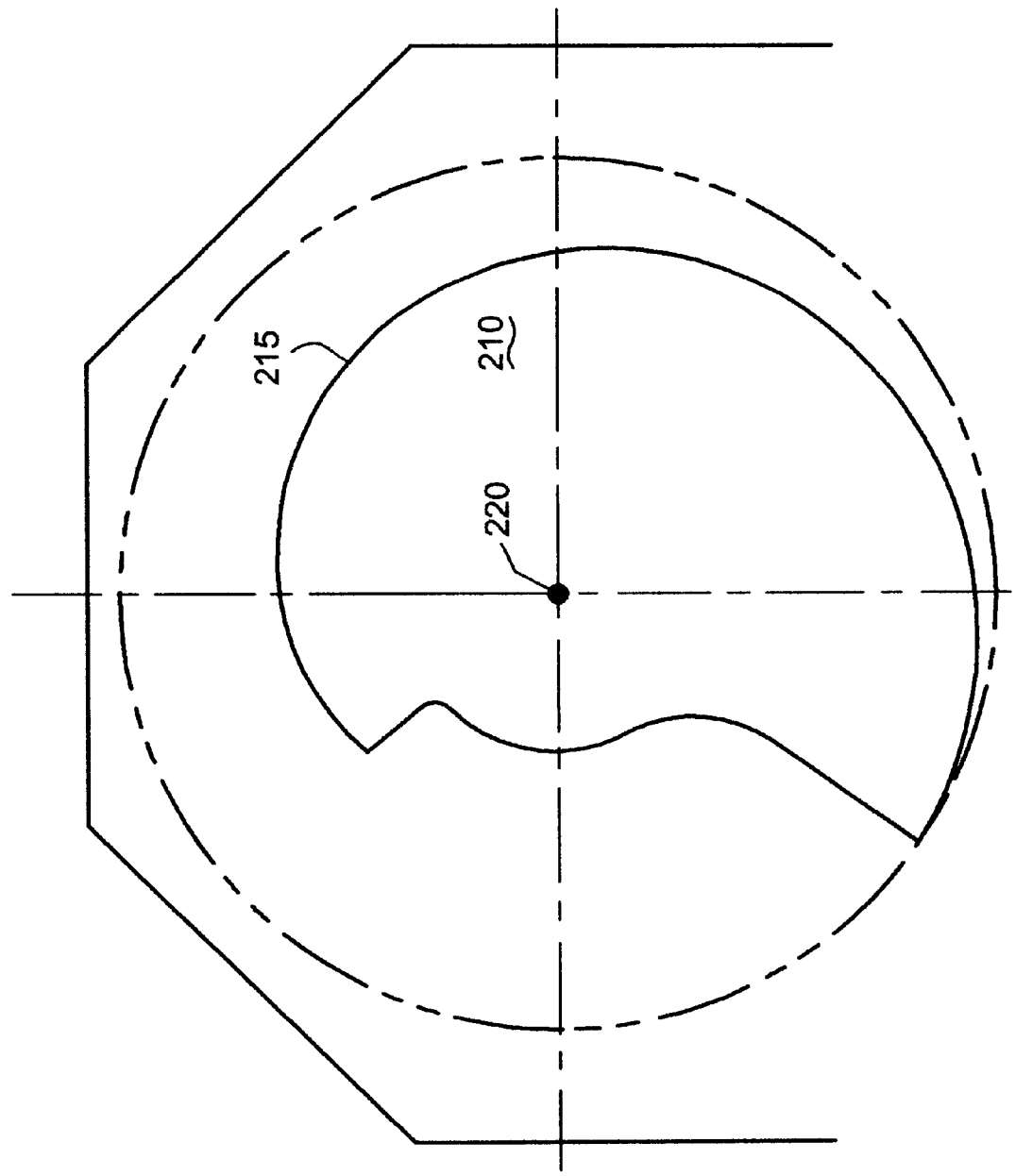
FIG. 3 illustrates a traditional prior art involute slicing blade.

A known knife blade for use in the slicing machine of FIGS. 1 and 2 is shown in FIG. 3. As shown, the assembly includes a blade 210 having an involute shaped cutting edge 215. The blade 210 is rotated about its center axis 220 by, for example, the servomotor drive 171 or the like. Rotation of the blade 210 is coordinated with the movement of the food loaves by the loaf feeding mechanism 75 and with the operation of the receiving conveyor 130 that receives the sliced food loaves for stacking or shingling. As illustrated, the blade 210 is disposed interior to a protective housing 225 or shield to prevent injury to machine operators. When blade 210 is rotated, the outermost portion of cutting edge passes along a circular path having axis 220 at its center.

FIGS. 4–7 illustrate operation of the traditional involute slicing blade 210 as it cuts into a pair of round food loaves 230 that are disposed in a side-by-side relationship. The round food loaves 230 are disposed so that the slicing face of each loaf is generally parallel to the plane of the slicing blade 210. Further, the loaves 230 are disposed approximately equidistant a vertical axis 240 extending through the axis of rotation 220 of blade 210.

Figure 4:
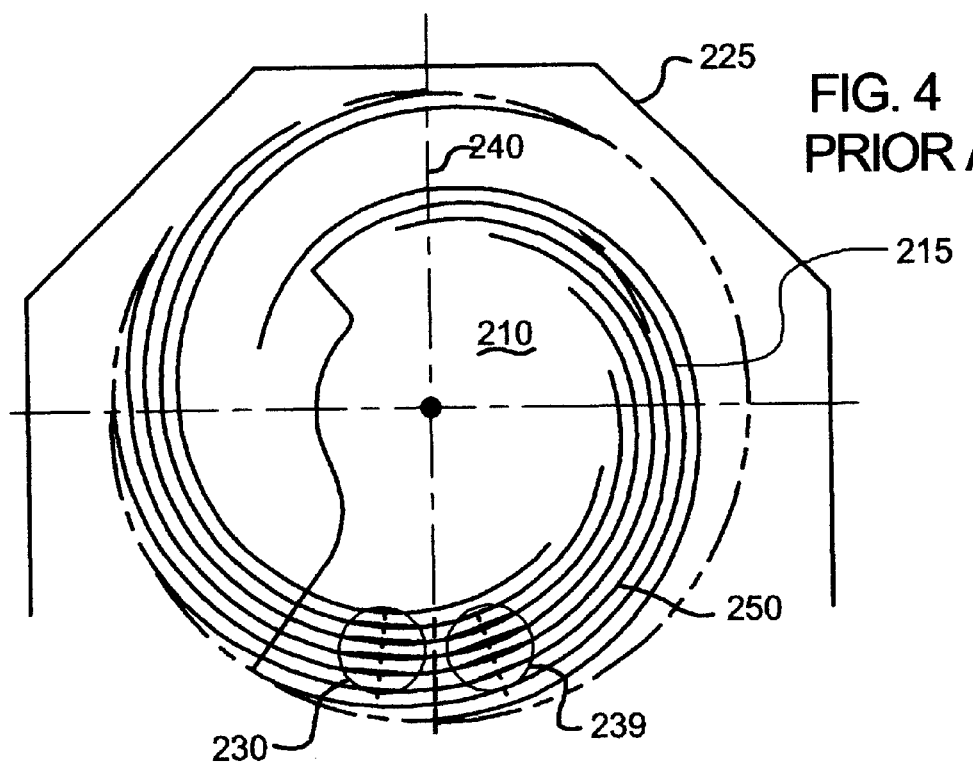

To facilitate an understanding of the slicing operation, FIGS. 4 and 5 are provided with an illustration of the penetration of the blade 210 into the loaves 230. More particularly, penetration lines 250 illustrate penetration of the blade 210 into the loaves 230 in 30 degree rotation increments of rotation of the blade 210. As such, the spacing between adjacent penetration lines 250 constitutes a penetration gradient in which the distance between successive penetration lines 250 is a measure of the magnitude of the penetration gradient. The direction of the penetration gradient through each loaf 230 is found by first connecting the points of intersection between the loaf edges and penetration lines 250. For purposes of the present discussion, these lines shall be referred to as lines of intersection and are designated at 255. A line normal to each line of intersection 255 in the direction of blade travel is then drawn. Such lines are hereinafter referred to as penetration direction vectors and are designated at 265.

Figure 6:
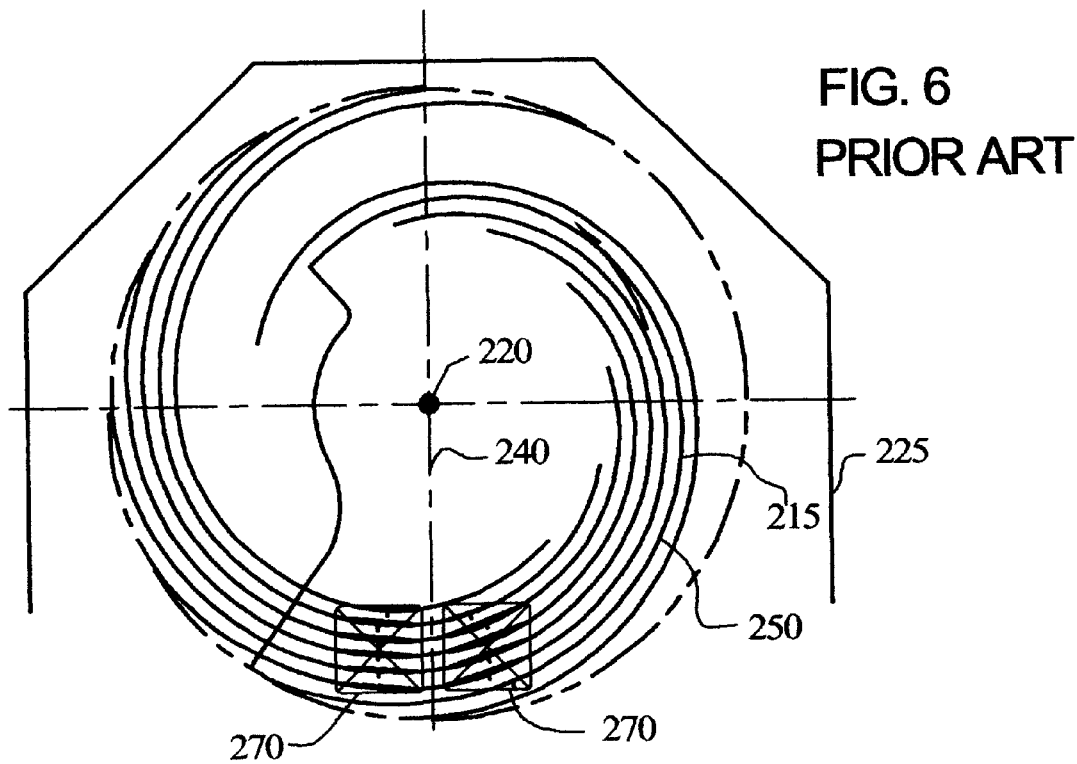

With reference to FIGS. 4 and 5, the present inventors have recognized two principal factors giving rise to the non-uniformity of stacking and/or shingling of sliced groups when using the traditional involute slicing blade 210, particularly at high slicing speeds. First, the direction of the penetration vectors 265a and 265b differ from one another at the points at which the slices are severed from the loaves. As such, the blade 210 provides an unequal throw of the slices from the left and right loaves as the slices proceed onto the receiving conveyor 130. Second, the magnitude of the penetration gradients through the loaves remains at substantially the same magnitude throughout the high-speed cutting cycle. This latter factor gives rise to difficulties in retaining control of the orientation and movement of each slice as it proceeds from the loaf onto the receiving conveyor 130. As illustrated in FIGS. 6 and 7, these same factors are also present and, indeed, more pronounced when slicing a rectangular loaves 270.

Figure 10:
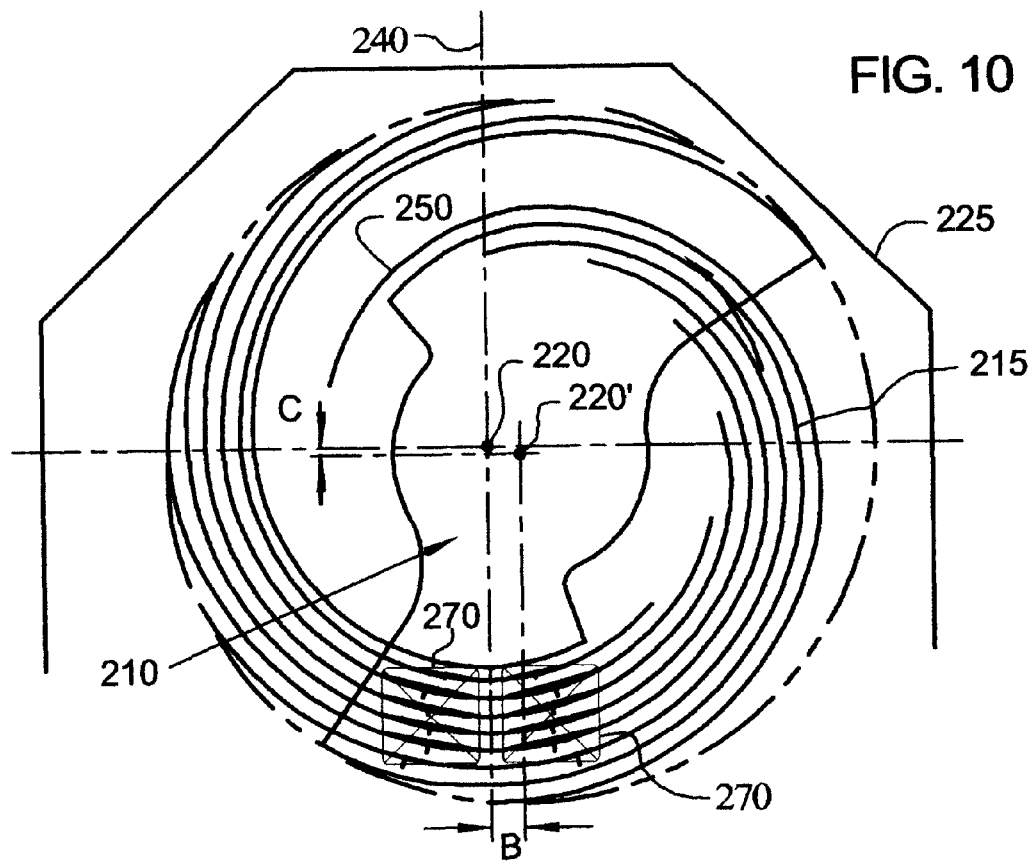
FIGS. 8–11 illustrate operation of an involute slicing blade in the slicing station of the present invention when slicing food loaves that are disposed in a side-by-side manner.
Figure 8:
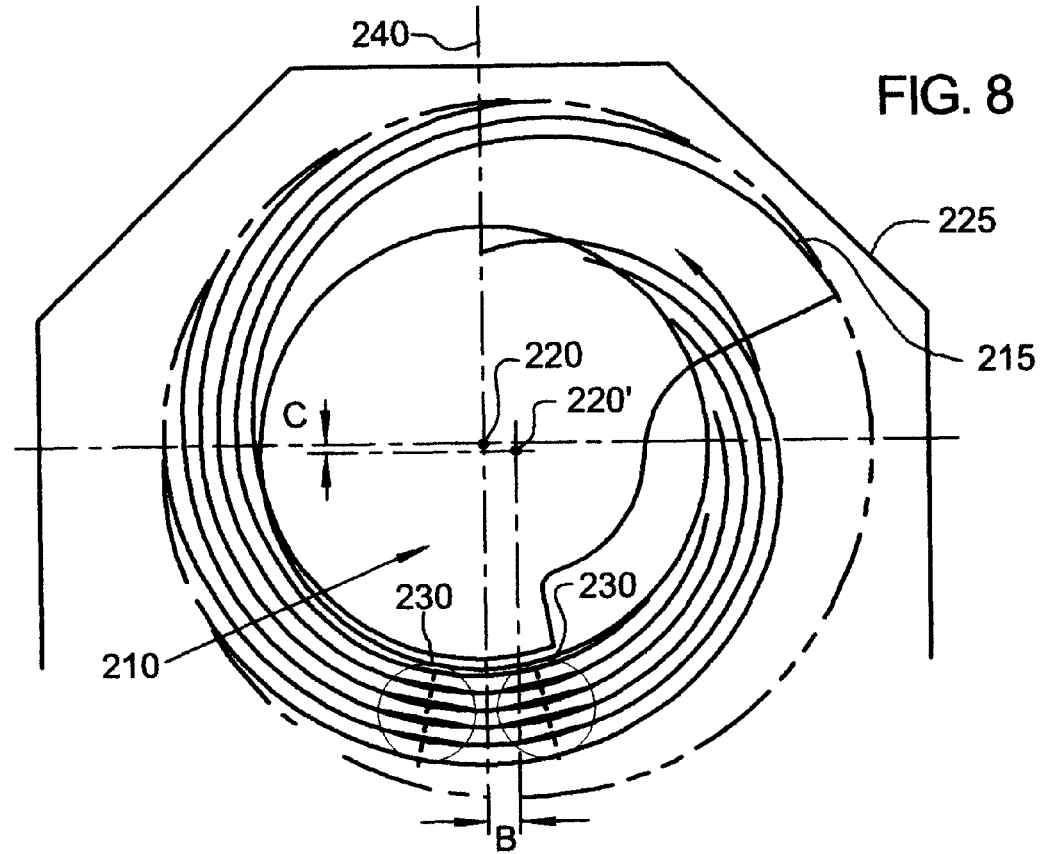
Figure 11:
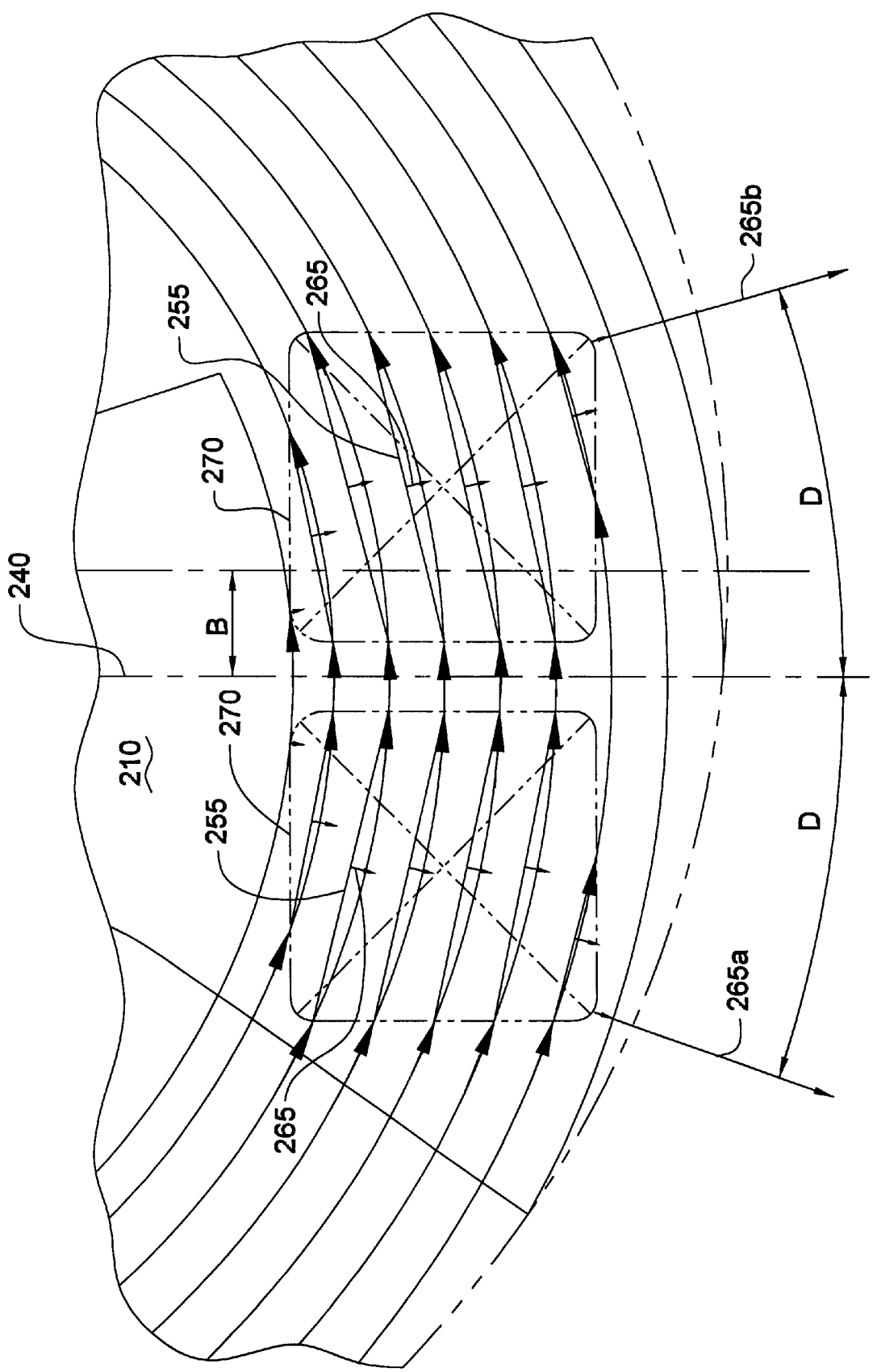

The present inventors have recognized that a substantially equal but oppositely directed throw about axis 240 may be obtained by offsetting the center of rotation 220 blade from axis 240. In such an instance, the axis 240 that is disposed generally equidistant food loaves 230 of FIGS. 4 and 5, and 270 of FIGS. 6 and 7 no longer passes through the axis of rotation 220 of the blade 210. Such a blade and corresponding offset are illustrated in FIGS. 8–11 with the penetration lines 250 and penetration direction vectors 265. As illustrated, blade 210 is rotated about axis of rotation 220' which is displaced laterally and below the axis of rotation that is normally used, shown at 220. The lateral offset B generates penetration direction vectors 265a and 265b at slice completion that are of substantially the same magnitude and have generally the same but oppositely directed throw angles D with respect to axis 240. Vertical offset C compensates for lateral offset B so that the blade 210 cuts completely through both loaves 230. FIGS. 10 and 11 illustrate the same principles with respect to rectangular loaves 270.

Figure 12:
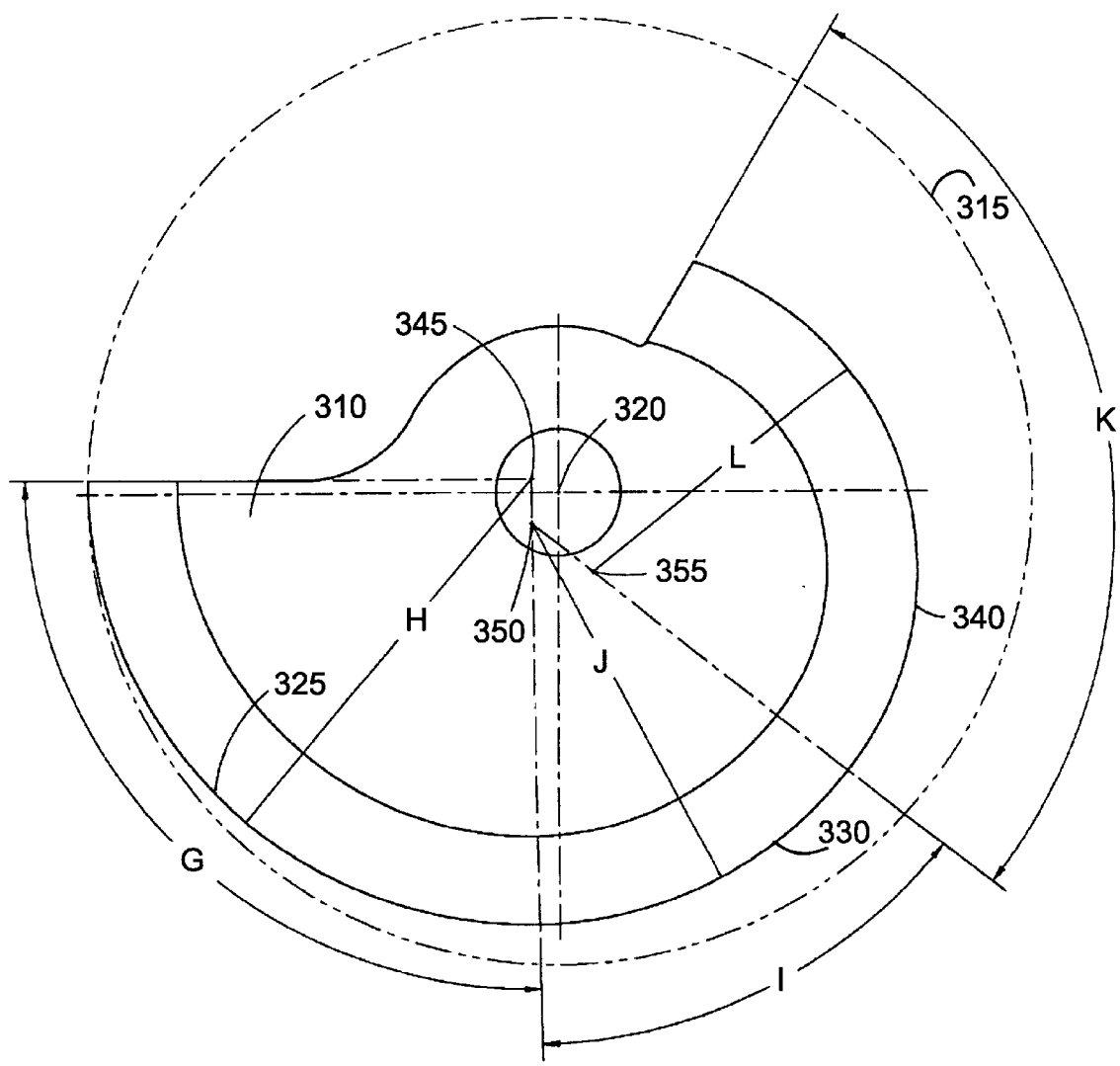
FIG. 12 illustrates one embodiment of a slicing blade for slicing food loaves that are disposed in a side-by-side manner wherein the slicing blade provides a penetration gradient that is larger at the beginning portions of the slicing cycle than the penetration gradient at the end portion of the slicing cycle.

With reference to FIG. 12, a modified blade 310 is illustrated that is dimensioned to concurrently cut at least two food loaves that are disposed in a side-by-side relationship and provide a penetration gradient in each of the loaves that provides greater control of the slices as they are severed from their respective loaves when compared to the involute blade described above. This is achieved by providing an initial penetration gradient for each of the loaves that is greater in magnitude during the initial portion of a slicing cycle than the magnitude of the penetration gradient occurring toward the end portion of the slicing cycle.

As illustrated, the outermost portion of blade 310 forms a circle 315 when rotated about center point 320. The blade edge is defined by arcs 325, 330, and 340 having different arc centers and different arc radii. In the illustrated embodiment, arc 325 has a center point at 345, an arc length of G, and a radius of H. Arc 330 has a center point at 350, an arc length of I, and a radius of J. Arc 340 has a center point at 355, an arc length of K, and a radius of L. As shown, points 345 and 350 are collinear and points 350 and 355 are likewise collinear. This provides a smooth transition of the cutting edge between the arcs 325, 330, and 340. Point 345 is displaced above and to the left of center point 320. Point 350 is displaced below and to the left of center point 320. Point 355 is displaced below and to the right of center point 320.

In accordance with one embodiment of the blade 310, the measurements are those set forth in Table 1 below.

| PARAMETER | MEASUREMENT |
| --- | --- |
| Point 345 displacement | Lateral displacement = −.457 in. |
| | Transverse displacement = +.225 in. |
| Arc length G (degrees) | 90.83 deg. |
| Radius H (inches) | 15.109 in. |
| Point 350 displacement | Lateral displacement = −.446 in. |
| | Transverse displacement = −.516 in. |
| Arc length I (degrees) | 50.95 deg. |
| Radius J (inches) | 13.629 in. |
| Point 355 displacement | Lateral displacement = +.593 in. |
| | Transverse displacement = −1.334 in. |
| Arc length K (radians) | 97.67 deg. |
| Radius L (inches) | 10.984 in. |

The foregoing measurements provide a blade suitable for cutting parallel disposed rectangular loaves ranging from 1 inch to 7 inches in width and from 1 inch to 4 inches in height. Similarly, such a blade is suitable for cutting parallel disposed round loaves ranging from 1 inch to 5.5 in. in diameter. Preferably, the parallel disposed loaves are spaced about 1 inch part. The blade 310 may also be used to cut singular round loaves up to 6 inches in diameter or singular rectangular loaves of of to 4"×14".

Figure 13:
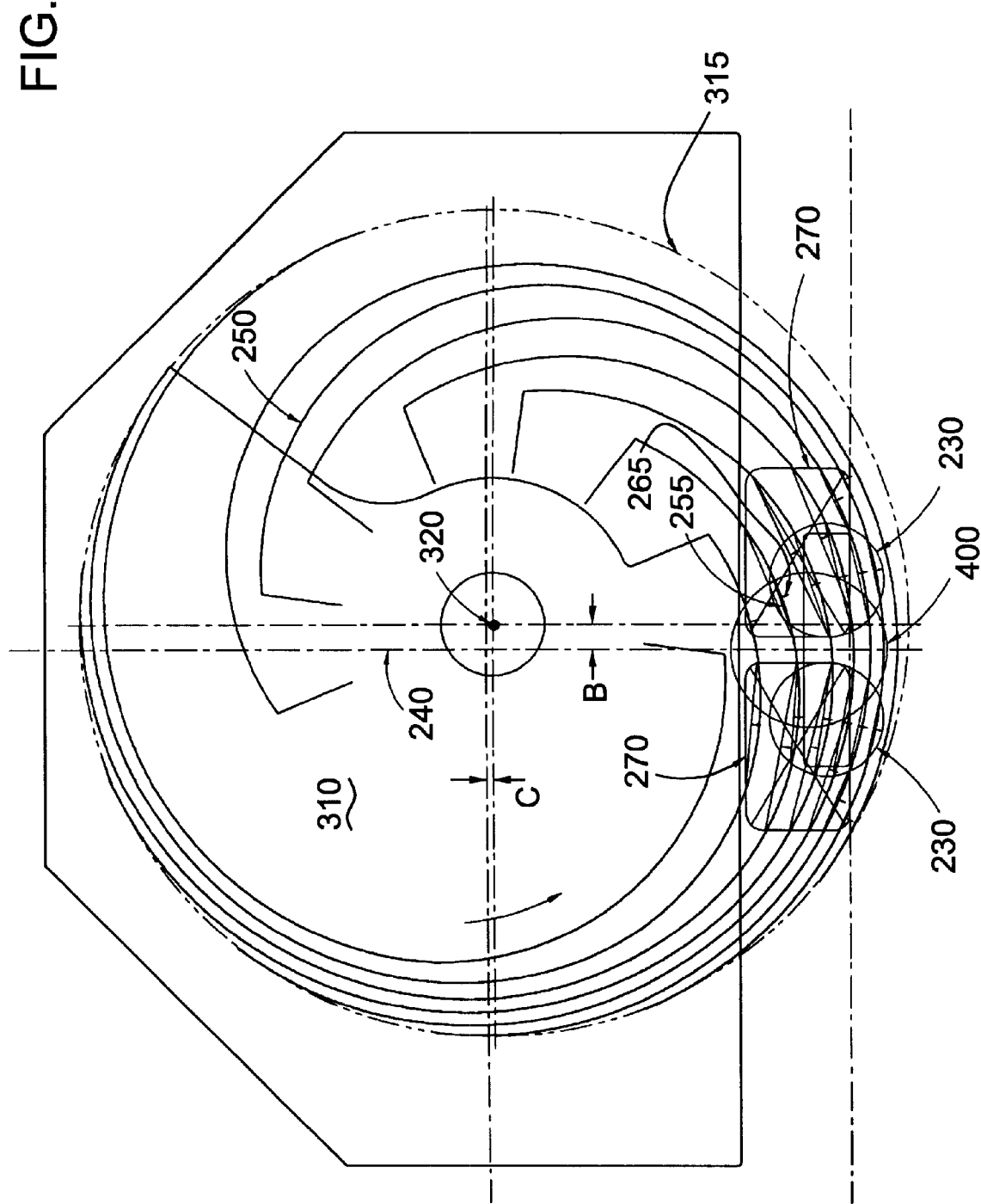
FIGS. 13–15 illustrate operation of the blade of FIG. 12 when used in the slicing station of the present invention.
Figure 14:
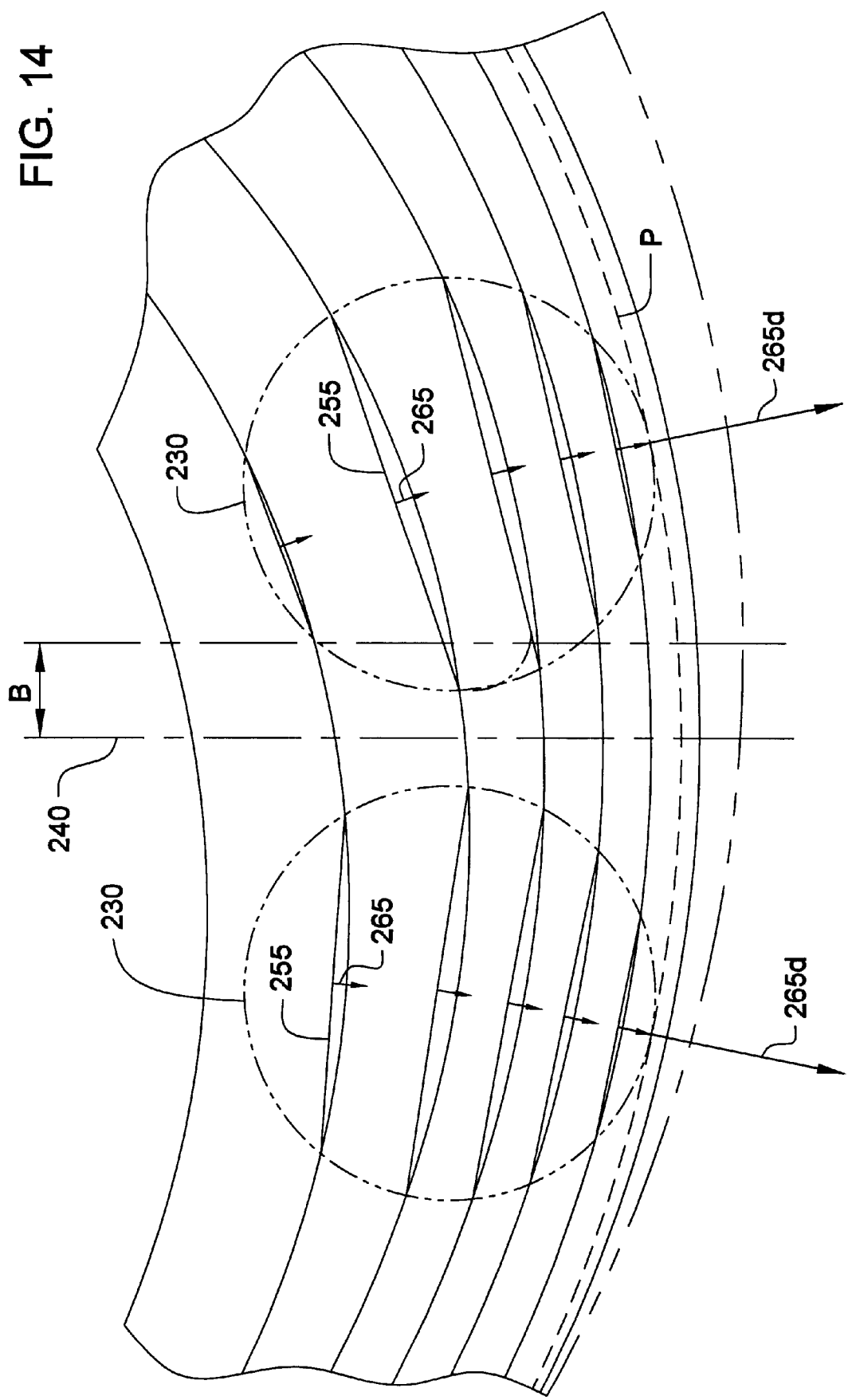
Figure 15:
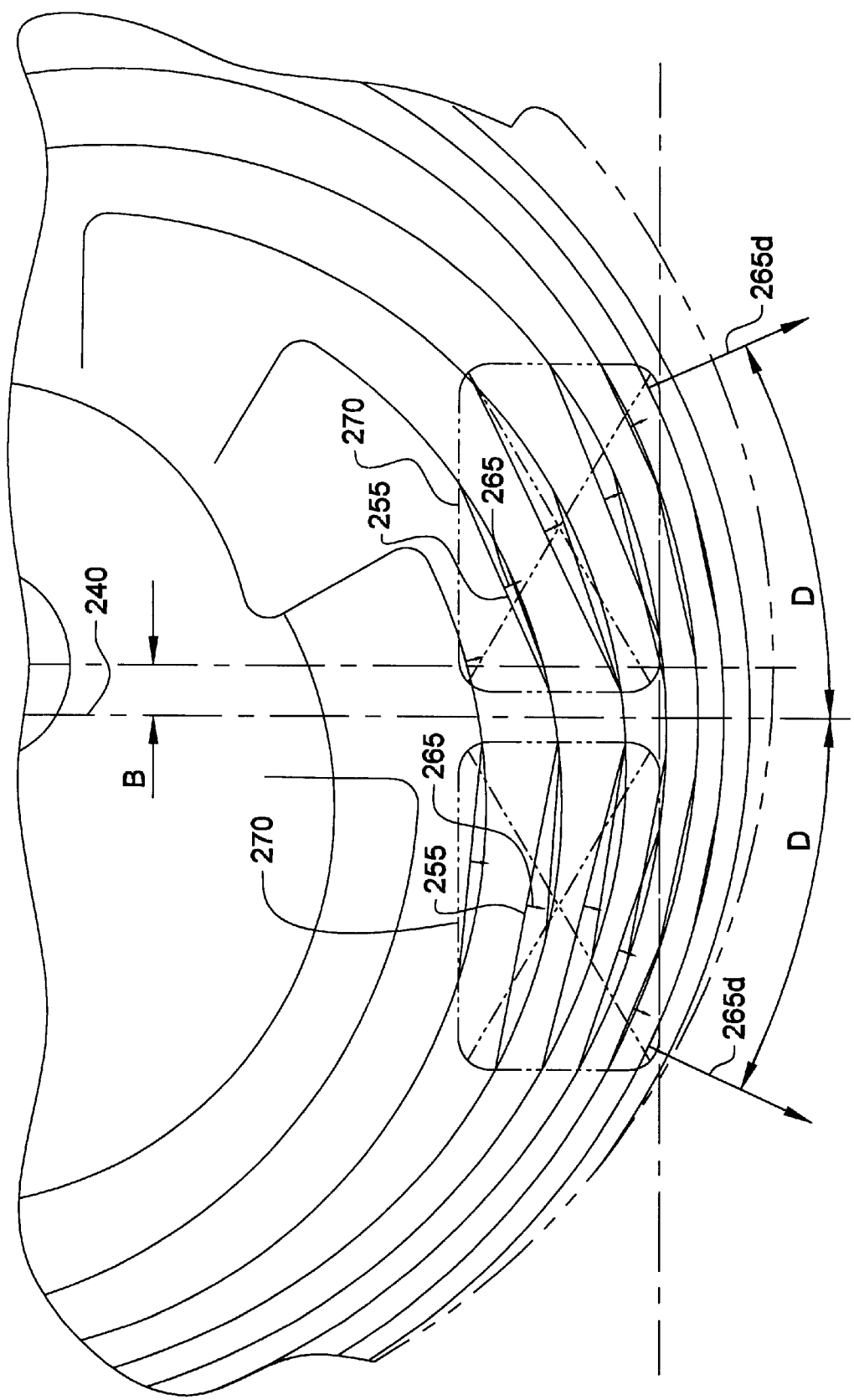

To facilitate an understanding of the slicing operation when using blade 310, FIGS. 13–15 are provided with illustrations of the penetration of the blade 310 into the loaves. As above, penetration lines 250 illustrate penetration of the blade 310 into the loaves in 30 degree rotation increments of the blade. As such, the spacing between adjacent lines constitutes a penetration gradient in which the distance between successive lines is a measure of the magnitude of the penetration gradient. Also as above, the direction of the penetration gradient through each loaf is found by connecting the points of intersection between the loaf edges and penetration lines 250. For purposes of the present discussion, these lines shall be referred to as lines of intersection and are designated at 255. A line normal to each line of intersection 255 in the direction of blade travel is then drawn. Such lines, as noted above, are referred to as penetration direction vectors and are designated at 265 in the figures.

FIG. 13 illustrates the foregoing parameters as applied to a single round loaf 400, parallel disposed rectangular loaves 270, and parallel disposed round loaves 230. As shown in FIG. 13, the axis of rotation 320 defined by the center of circle 315 (see above) is laterally offset from axis 240 which is generally equidistant the parallel disposed loaves 230 and 270 and which provides a median through the center of single loaf 400. Additionally, the arcs 325, 330, and 340 defining the cutting edge of blade 310 generate a penetration gradient that is greater during the initial phase of the cutting cycle than at the end phase of the cutting cycle. Preferably, the blade 310 is driven at a constant rate of rotation, the arcs of varying radii providing the desired penetration gradient magnitude effect.

FIG. 14 provides a close-up view of the penetration lines 250 and penetration direction vectors 265 as applied to a pair of parallel disposed round loaves 230 while FIG. 15 provides a close-up view of the penetration lines 250 and penetration direction vectors 265 as applied to parallel disposed rectangular loaves 270. In each instance, the magnitude of the penetration gradient decreases as the blade proceeds through a single cutting cycle. This is due to the shape of the cutting edge. Further, the direction of the penetration direction vectors 265d and 265d at the end phase of the cutting cycle are at substantially the same angles D with respect to the axis 240. As such, the angles at which the slices proceed onto the receiving conveyor 130 are the same, thereby providing a more even stacking or shingling of the sliced product.

Figure 16:
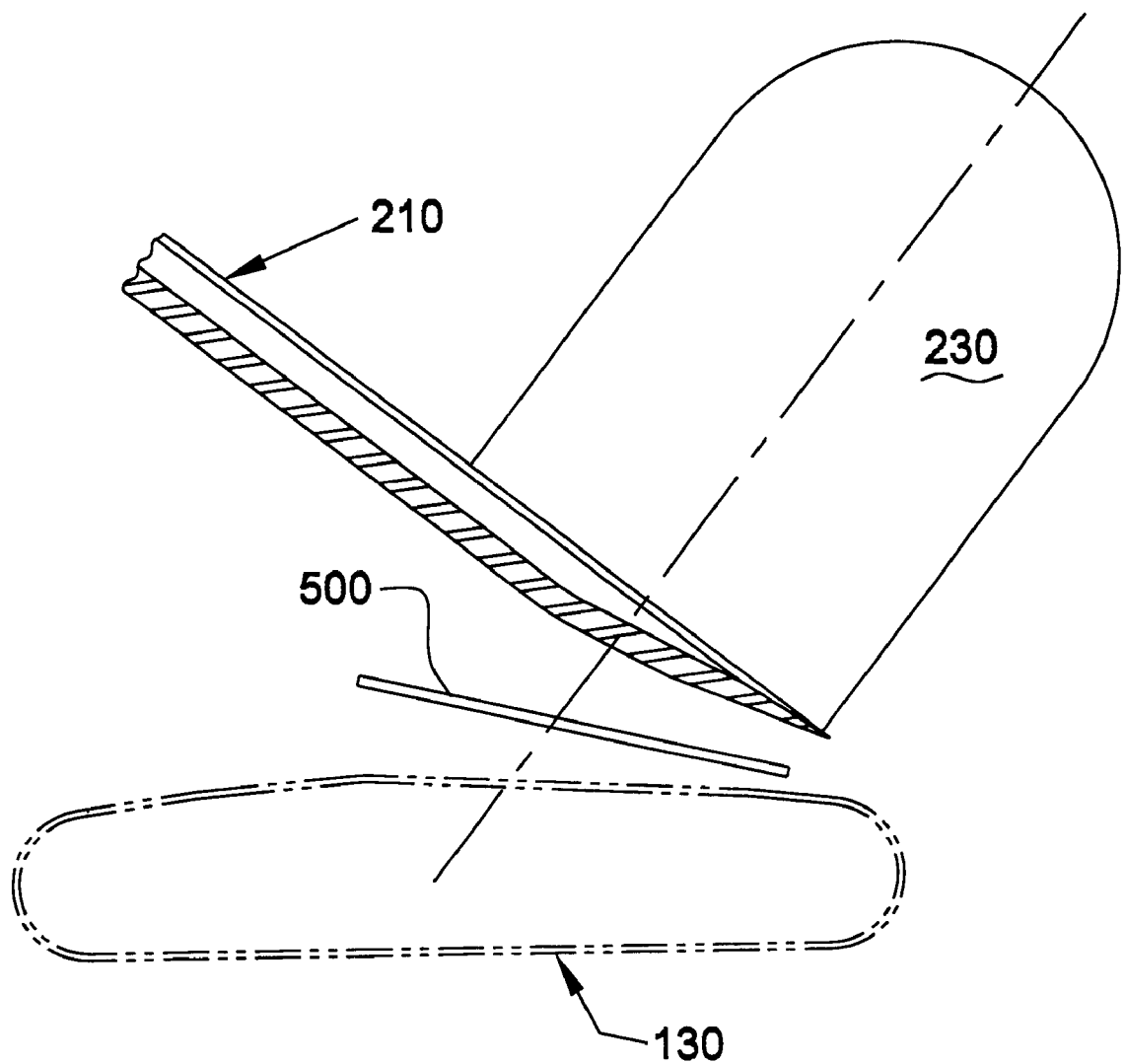
FIGS. 16 and 17 illustrate operation of a blade that does not provide a penetration gradient and a blade that provides a penetration gradient, respectively.
Figure 17:
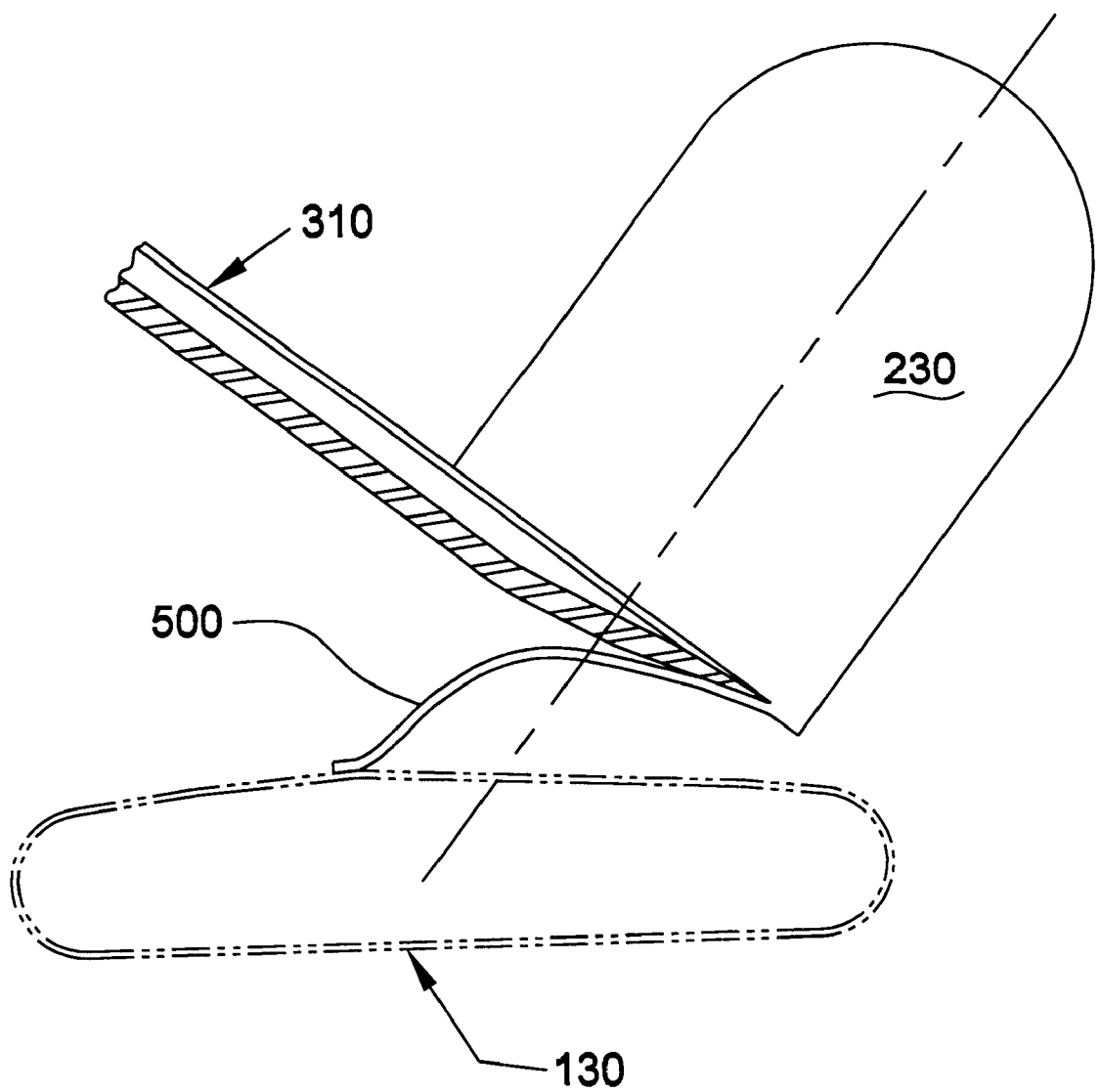

The significance of the variation in penetration gradient magnitude throughout the cutting cycle can be understood with reference to FIGS. 16 and 17. FIG. 16 illustrates cutting of a product slice using a blade 210 having a constant penetration magnitude throughout the cutting cycle. One such blade is the traditional involute blade described above. As shown, during high speed cutting operation, the slice 500 is airborne as it is severed by blade 210 from the loaf 230 and deposited onto the receiving conveyor 130. In contrast and as shown in FIG. 17, a blade 310 having the penetration gradient magnitude variations described above allows the slice 500 to contact the surface of the receiving conveyor 130 prior to its ultimate severance from the loaf 230. As such, the stacking or shingling operation proceeds in a controlled fashion when compared to the airborne slicing operation illustrated in FIG. 16.

Figure 18:
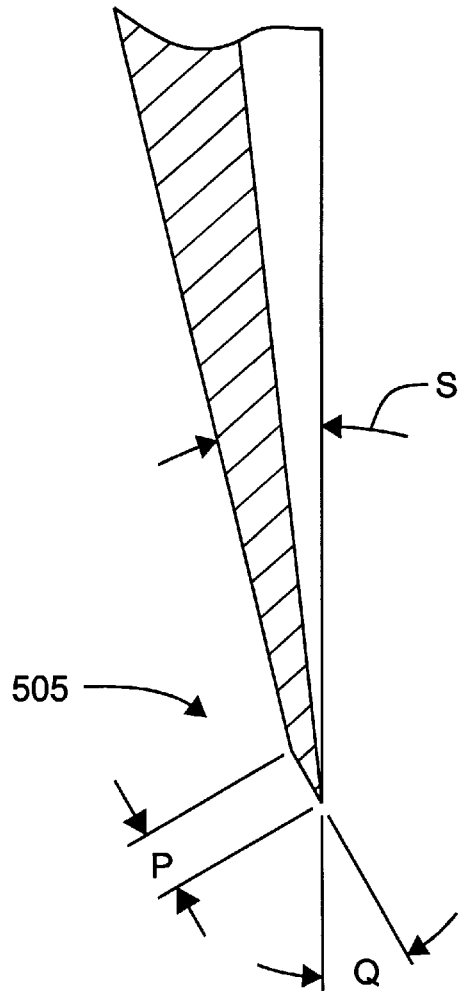
FIGS. 18 and 19 are perspective views of a single bevel cutting edge and a double bevel cutting edge, respectively, that may be used for the cutting edges of blades constructed in accordance with the principles of the present invention.
Figure 19:
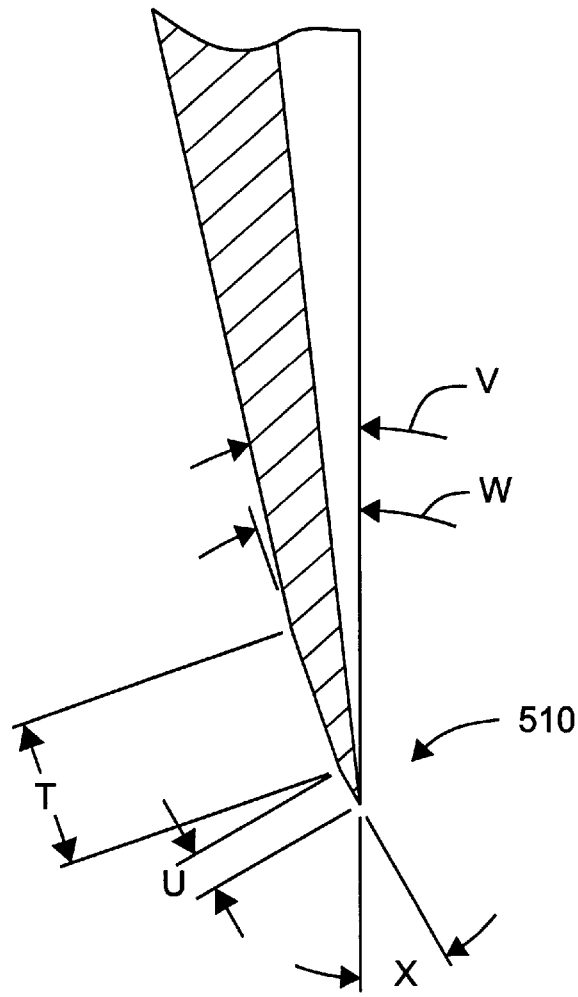

To further enhance the operation of blade 310, it may be provided with a beveled cutting edge that is specifically adapted to cut a particular product. To this end, a single bevel cutting edge 505 is illustrated in FIG. 18 while a double beveled cutting edge 510 is illustrated in FIG. 19. In connection with FIG. 18, the beveled cutting edge 505 may be defined in terms of length parameter P and angle parameters Q and S. In connection with FIG. 19, the beveled cutting edge 510 may be defined in terms of length parameters T and U and angle parameters V, W and X. These parameters may be determined experimentally when using blade 310 with a particular loaf product to optimize the cutting process and generally vary from loaf product type to loaf product type.

Figure 9:
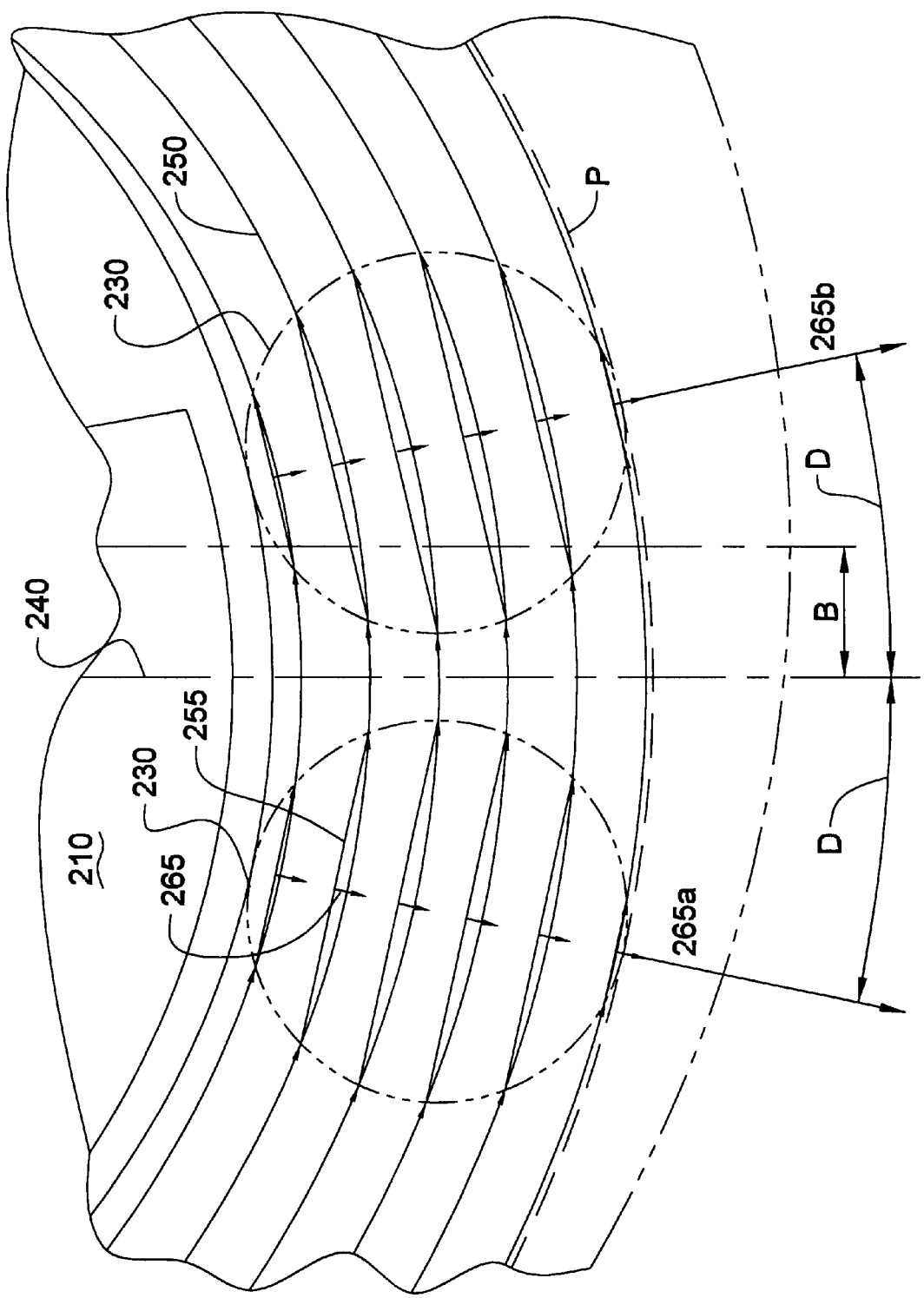

A further inventive aspect of the lateral offset blades illustrated in the above-noted figures can be seen with respect to FIGS. 9 and 14 as compared to FIG. 5. As illustrated in FIG. 5, the blade 210 completes severance of a slice from the left product loaf a substantial period of time before it completes severance of a slice from the right product loaf. Any other operations of the slicing machine that are to occur subsequent to the completion of a slicing cycle must therefore wait until the slice severance from the right loaf is complete, even though a completed slice has been received from the left loaf. In contrast, the offset blades of FIGS. 9 and 14 complete severance of the slices from the left and right loaves 230 at substantially the same portions of the slicing cycle and, therefore, at substantially the same time (see penetration line P). As such, more time becomes available for post-slicing machine operations. This functional aspect of the offset blades may be used to effectively increase the speed of operation of the slicing machine.

Numerous modifications may be made to the foregoing system without departing from the basic teachings thereof. Although the present invention has been described in substantial detail with reference to one or more specific embodiments, those of skill in the art will recognize that changes may be made thereto without departing from the scope and spirit of the invention as set forth in the appended claims.

What is claimed is:

1. In a slicing machine for slicing at least first and second product loaves disposed in a lateral side-by-side arrangement using a single slicing blade to produce two groups of stacked or shingled slices corresponding to the first and second product loaves, a vertical midway passing axis passing midway between the first and second product loaves in a plane containing the blade, a slicing blade arrangement comprising:

a slicing blade having a slicing edge and a center of rotation; said slicing edge having a curved shape such that a single rotation of the slicing edge about the center rotation results in a penetration gradient into each of the first and second product loaves that diminishes in magnitude over the single rotation;

a loaf guide for guiding said first and second product loaves along preselected feed paths as the loaves are sliced into slices by said slicing blade, said feed paths arranged along respective lengths of said first and second loaves;

the slicing blade being mounted in the slicing arrangement with respect to said loaf guide so that the center of rotation is displaced from the midway passing axis;

a receiving surface located below said feed paths, adjacent the slicing blade, said receiving surface horizontally disposed in a lateral direction, said receiving surface arranged to receive slices cut from said first and second loaves in two stacks, vertical clearances between each of said first and second loaves, adjacent the slicing blade, and the receiving surface being substantially equal and set such that each slice touches said receiving surface before being separated completely from the respective loaf; and at slice completion, the slicing edge generating adjacent, substantially equal penetration vector angles through the first and second product loaves measured in opposite rotational direction from the midway passing axis.

2. A slicing blade arrangement as claimed in claim 1 wherein the curved shape of the slicing edge is defined by a plurality of constant radius sections, each constant radius section having a section center defining the center of the constant radius for that constant radius section, each constant radius section having a section center differing from the section center of an adjacent constant radius section.

3. A slicing blade arrangement as claimed in claim 2 wherein the plurality of constant radius sections comprises:

an initial constant radius section having a first radius magnitude and a first section center, the first section center being displaced below and laterally from the center of rotation; and a final constant radius section having a second radius magnitude that is larger than the first radius magnitude, the final constant radius section having a section center that is displaced above and laterally from the center of rotation, the initial constant radius section being disposed to cut into the first and second product loaves prior to cutting by the final constant radius section upon rotation of the blade about the center of rotation.

4. A slicing blade arrangement as claimed in claim 3 wherein the plurality of constant radius sections further comprises an intermediate constant radius section having a third radius magnitude that is larger than the first radius magnitude and smaller than the second radius magnitude, the intermediate constant radius section having a section center that is displaced below and laterally from the center of rotation.

5. A slicing blade arrangement as claimed in claim 1, comprising a conveyor, wherein said receiving surface comprises a top surface of said conveyor, said top surface movable to transport said two stacks.

6. A slicing blade arrangement as claimed in claim 1, comprising a loaf feed conveyor having at least one conveying surface for feeding said first and second loaves and a stationary end plate, said loaf guide comprising two spaced-apart recesses in said end plate.

7. A slicing blade arrangement as claimed in claim 1, wherein said two stacks comprise shingled stacks.

8. In a slicing machine for slicing at least first and second product loaves disposed in a lateral side-by-side arrangement using a single slicing blade to produce two groups of stacked or shingled slices corresponding to the first and second product loaves, a vertical midway passing axis passing midway between the first and second product loaves in a plane containing the blade, a slicing blade arrangement comprising:

a slicing blade having a slicing edge with a profile defined by a plurality of constant radius sections, each constant radius section having a section center defining the center of the constant radius for that constant radius section, each constant radius section having a section center differing from the section center of an adjacent constant radius section;

a center of rotation;

said slicing edge having a curved shape such that a single rotation of the slicing edge about the center of rotation results in a penetration gradient into each of the first and second product loaves that diminishes in magnitude over the single rotation;

a loaf guide for guiding said first and second product loaves along preselected feed paths as the first and second loaves are sliced into slices by said slicing blade, said feed paths arranged along respective lengths of said first and second loaves;

the slicing blade being mounted in the slicing arrangement with respect to said loaf guide so that the center of rotation is displaced from the midway passing axis;

a receiving surface located below said feed paths, adjacent the slicing blade, said receiving surface horizontally disposed in a lateral direction, said receiving surface arranged to receive slices cut from said first and second loaves in two stacks, the vertical clearances between each of said first and second loaves, adjacent the slicing blade, and the receiving surface being substantially equal and set such that each slice touches said receiving surface before being separated completely from the respective loaf; and at slice completion, the slicing edge generating adjacent, substantially equal penetration vector angles through the first and second product loaves measured in opposite rotational direction from the midway passing axis.

9. A slicing blade arrangement as claimed in claim 8 wherein the plurality of constant radius sections comprises:

an initial constant radius section having a first radius magnitude and a first section center, the first section center being displaced below and laterally from the center of rotation; and a final constant radius section having a second radius magnitude that is larger than the first radius magnitude, the final constant radius section having a section center that is displaced above and laterally from the center of rotation, the initial constant radius section being disposed to cut into the first and second product loaves prior to cutting by the final constant radius section upon rotation of the blade about the center of rotation.

10. A slicing blade as claimed in claim 9 wherein the plurality of constant radius section further comprises an intermediate constant radius section having a third magnitude that is larger than the first radius magnitude and smaller than the second radius magnitude, the intermediate constant radius section having a section center that is displaced below and laterally from the center of rotation.

11. A slicing blade arrangement as claimed in claim 10 wherein the section center of the intermediate constant radius section is collinear with the section center of the initial constant radius section.

12. A slicing blade arrangement as claimed in claim 10 wherein the section center of the intermediate constant radius section is collinear with the section center of the final constant radius section.

13. A slicing blade arrangement as claimed in claim 10 wherein the section center of the intermediate constant radius section is collinear with the section center of the initial constant radius section and wherein the section center of the intermediate constant radius section is collinear with the section center of the final constant radius section.

14. A slicing blade arrangement as claimed in claim 13 wherein the center of rotation is offset from the section centers of the plurality of constant radius sections.

15. A slicing blade arrangement as claimed in claim 8 wherein the center of rotation is offset from the section centers of the plurality of constant radius sections.

16. A slicing blade arrangement as claimed in claim 8 wherein the plurality of constant radius sections comprises:

an initial constant radius section having a first radius magnitude and a first section center, the first section center being displaced below and laterally from the center of rotation; and a final constant radius section having a second radius magnitude that is larger than the first radius magnitude, the final constant radius section having a section center that is displaced above and laterally from the center of rotation, the initial constant radius section being disposed to cut into the first and second product loaves prior to cutting by the final constant radius section upon of the blade about the center of rotation.

17. A slicing blade arrangement as claimed in claim 16 wherein the plurality of constant radius sections further comprises an intermediate constant radius section having a third radius magnitude that is larger than the first radius magnitude and smaller than the second radius magnitude, the intermediate constant radius section having section center that is displaced below and laterally from the center of rotation.

18. A slicing blade arrangement as claimed in claim 8, comprising a conveyor, wherein said receiving surface comprises a top surface of said conveyor, said top surface movable to transport said two stacks.

19. A slicing blade arrangement as claimed in claim 8, comprising a loaf feed conveyor having at least one conveying surface for feeding said first and second loaves and a stationary end plate, said loaf guide comprising two spaced-apart recesses in said end plate.

20. A slicing blade arrangement as claimed in claim 8, wherein said two stacks comprise shingled stacks.

* * * * *